Feb. 13, 1945.  W. A. ROSENBERGER  2,369,408
ABRADING APPARATUS
Filed Feb. 1, 1938  5 Sheets-Sheet 1
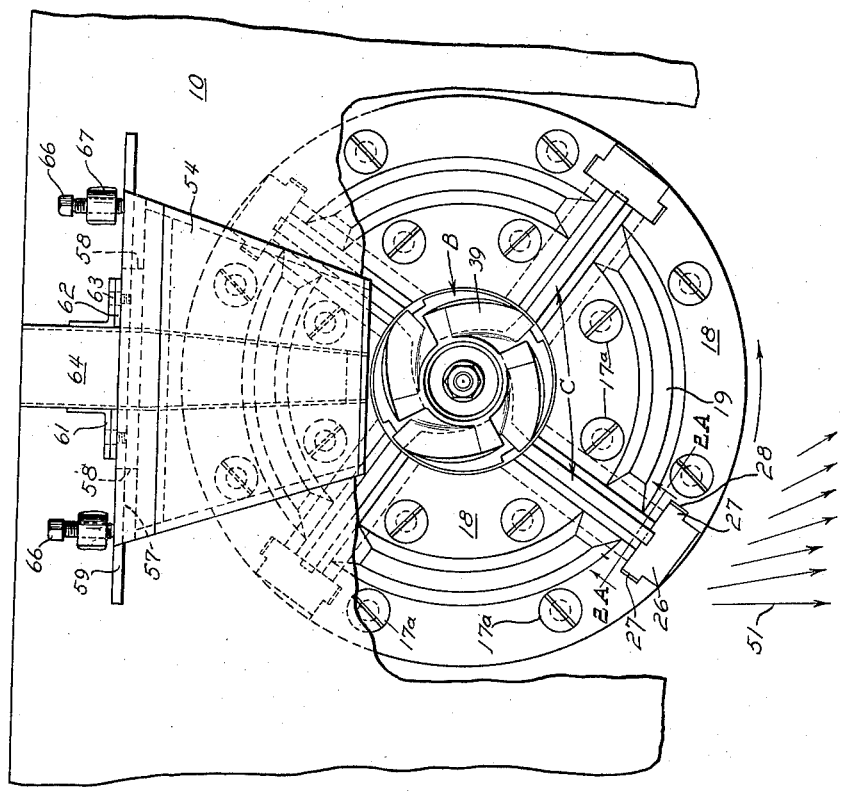
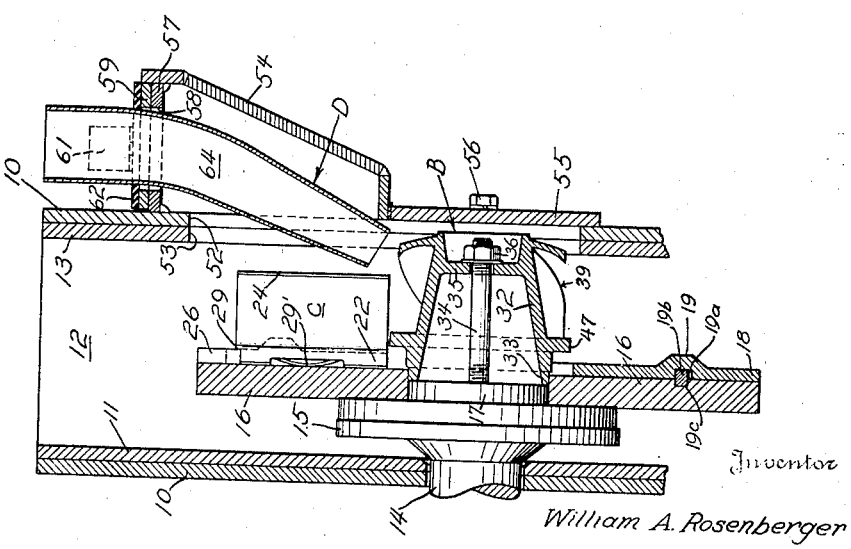
Inventor
William A. Rosenberger
By Strauch & Hoffman
Attorneys

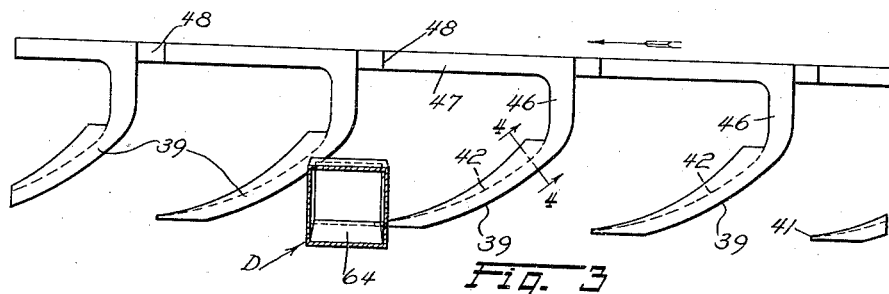
Fig. 3
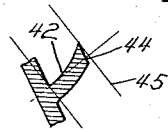
Fig. 4
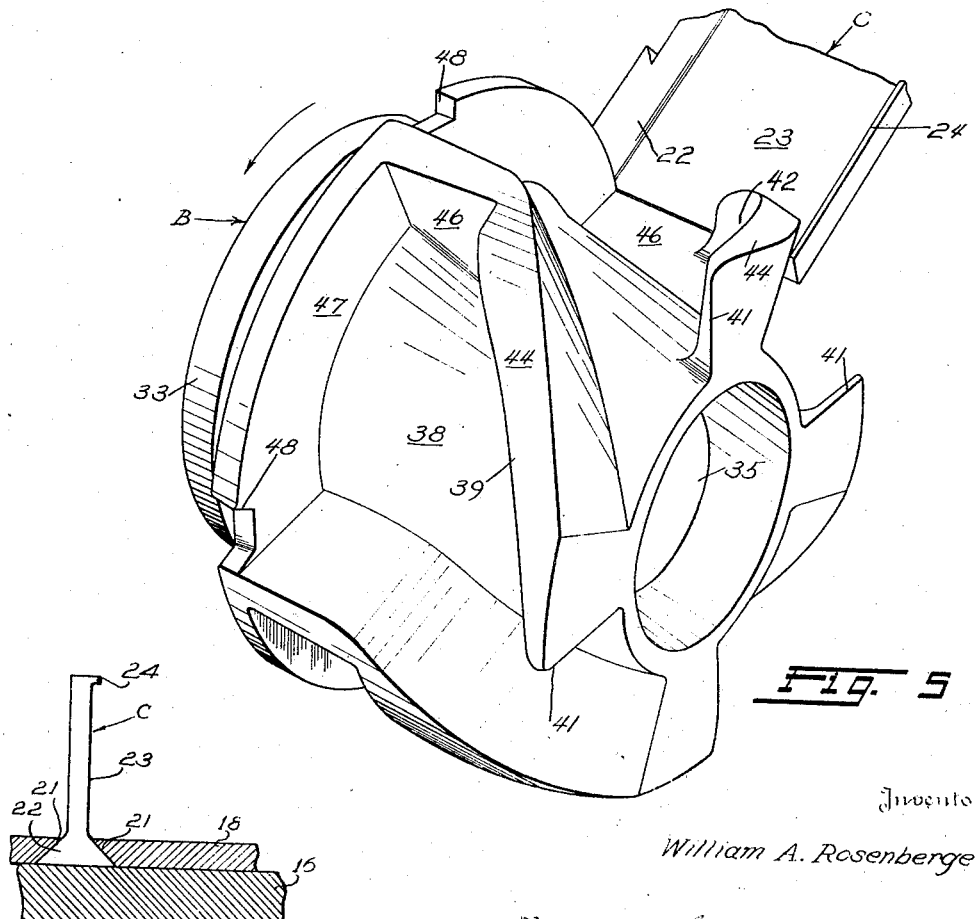
Fig. 5
Fig. 2A
Inventor
William A. Rosenberger
By Strauch & Hoffman
Attorneys

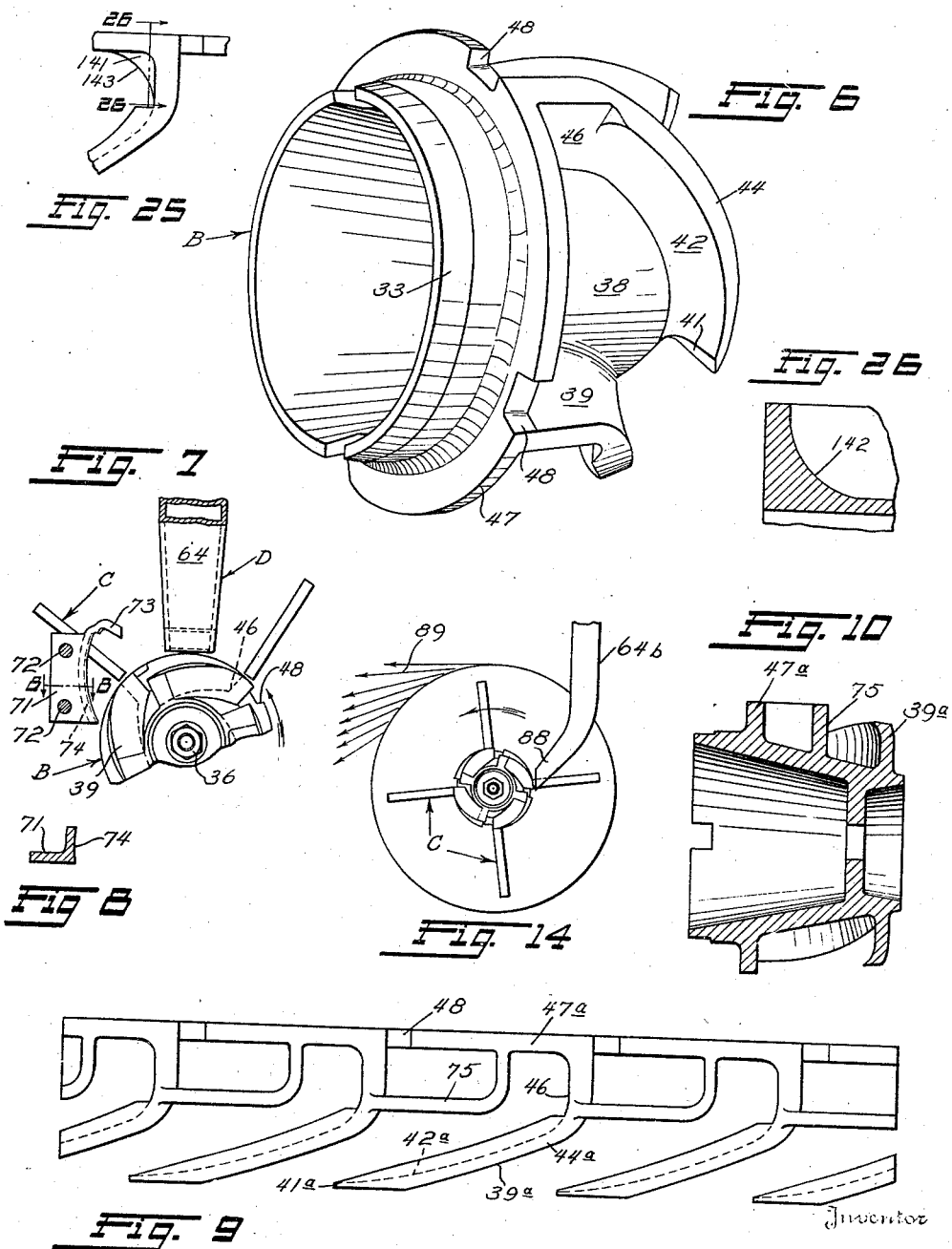

Feb. 13, 1945.　　　W. A. ROSENBERGER　　　2,369,408
ABRADING APPARATUS
Filed Feb. 1, 1938　　　5 Sheets-Sheet 4

Inventor
William A. Rosenberger

By Strauch & Hoffman
Attorneys

Feb. 13, 1945. W. A. ROSENBERGER 2,369,408
ABRADING APPARATUS
Filed Feb. 1, 1938 5 Sheets-Sheet 5

Inventor
William A. Rosenberger

Strauch & Hoffman
Attorneys

Patented Feb. 13, 1945

2,369,408

UNITED STATES PATENT OFFICE 2,369,408

ABRADING APPARATUS

William A. Rosenberger, Hagerstown, Md., assignor to Pangborn Corporation, Hagerstown, Md., a corporation of Maryland Application February 1, 1938, Serial No. 188,163

16 Claims. (Cl. 51—9)

This invention relates to abrading apparatus and more particularly to abrading apparatus of the character embodying bladed rotors for propelling abrasives at abrading velocities at any desired form of work, such as castings, steel sheets, stampings and the like to be surface cleaned of adhering molding sand, scale, and other extraneous matter, and also to change the character of the surface by roughening, peening or the like.

Although bladed rotors are in commercial use today for blast cleaning purposes they are not wholly satisfactory from the standpoint of maintenance as they embody a stationary central cage through which the abrasive is fed to the blades and the wear on this part is quite severe and frequent renewal thereof is necessary. Such machines in the majority of applications must blast downwardly, with the result that a rotatable impeller must be used to propel the abrasive out of an upwardly facing discharge port in the cage and it has been found that the life of impellers is even less than that of the cages, due to the grinding action set up by the abrasive trapped between it and the cage.

Abrasive propelling rotors which do not employ a cage or an impeller have been heretofore proposed, but they have not proved commercially feasible. In one form of machine the blades terminate short of the axis of rotation and the abrasive is fed into the central space. However, that machine discharges the abrasive upwardly, and as most applications require that the blast be directed downwardly from the rotor, it found but extremely limited application. Another machine of the prior art which employs neither a feed cage nor impeller embodies a plurality of blades secured at one side edge to the rotor, and abrasive is fed through a feed spout over the side edges of the blades adjacent the axis of rotation. Although this machine may be caused to discharge in any desired direction from the wheel by adjusting the discharge end of the feed pipe angularly about the axis of the rotor, it is open to several serious objections which render it commercially unfeasible in view of the high volume of work that must be rapidly handled today. For instance, the side edges of the blades, which must cut the abrasive ribbon issuing from the feed pipe, not only wear rapidly but their side edges also form a "barrier" to abrasive flow when operating at high speed, which in turn causes the machine to "choke" if more than a very low and non-commercial flow of abrasive is fed to the machine. By reason of the fact that in such machines the abrasive must horizontally "jump" the gap between the stationary feed pipe and the edges of the rotating blades, a considerable quantity of abrasive is never picked up by the blades and performs no useful work.

It is accordingly the major object of this invention to devise a centrifugal abrading wheel which does not embody a feed cage and yet propels commercial quantities of abrasive downwardly upon the work, with a minimum of wear upon the parts and operates with a maximum utilization of abrasive.

A further important object is to provide a centrifugal bladed abrading wheel in which the abrasive is fed downwardly to a point axially offset from the path of the blades, and rotating parts of the wheel pick up the abrasive, deflect it axially, and then propel it outwardly into the blades.

Another object is to provide a centrifugal, bladed abrading wheel in which the abrasive is fed downwardly to a point axially offset from the path of the blades through a feed pipe that is inclined so as to impart an axial velocity component to the abrasive, and rotating parts of the wheel pick up the abrasive, deflect it axially, and then propel it onto the blades with an initial outward velocity.

A further object is to provide a centrifugal abrading wheel which does not embody a stationary feed cage and yet is operable to propel commercial quantities of abrasive either downwardly or sideways at abrading velocities and embodies means for variably adjusting the action of the wheel upon the abrasive as it is initially picked up.

It is another object to devise a novel feeding assembly which may be substituted for the impeller and cage of bladed centrifugal abrading wheels and which is operable to rotate with the wheel and deflect abrasive from a downward path adjacent the wheel axially into the path of rotation of the blades.

Further objects are to devise for use in centrifugal blasting wheels, novel feeding assemblies, blade constructions, rebound guards, renewable and replaceable parts and other more detailed but yet important features that will become apparent as the specification proceeds in connection with the annexed drawings, and from the appended claims.

A further object is to devise a centrifugal abrading wheel which does not embody a feed cage and yet which is operable to propel commercial quantities of abrasive either downwardly, sideways or upwardly against the work, with a minimum of wear upon the parts and operates with a maximum utilization of the abrasive.

In the drawings:

Figure 1 is a longitudinal sectional view through a centrifugal abrading machine forming part of my invention;

Figure 2 is an end elevational view illustrating the machine as it appears from the right hand side of Figure 1 with the lower part of the housing cut away and the end closure removed;

Figure 2A is a fragmental sectional view taken on the line 2A—2A of Figure 2 illustrating the cooperation between the blades and blade guides;

Figure 3 is a diagrammatic view illustrating the deflector members developed out in a horizontal plane and shows them in top plan view with the feed spout in cooperative relationship therewith;

Figure 4 is a fragmental sectional view of one of the deflector members and is taken on the line 4—4 of Figure 3;

Figure 5 is a perspective view of the deflector assembly of the machine shown in Figure 1 as it appears when removed from the machine and one of the abrasive propelling blades has been illustrated as associated therewith;

Figure 6 is also a perspective view of the deflector assembly but illustrates the rear face thereof;

Figure 7 is an end elevational view of the machine shown in Figures 1 and 2 and is somewhat similar to Figure 2 but illustrates a stationary rebound member associated with the rotor.

Figure 8 is a sectional view taken on the line 8—8 of Figure 7;

Figure 9 is a view somewhat similar to Figure 3, but illustrates a modified form of deflector assembly;

Figure 10 is a longitudinal sectional view of the deflector assembly diagrammatically represented in Figure 9;

Figure 14 is an end elevational view illustrating a wheel having a further modified form of feed spout;

Figure 25 is a fragmental view of a modified form of deflector forming part of the invention.

Figure 26 is a sectional view taken on the line 26—26 of Figure 25, looking in the direction of the arrows.

Figure 11:
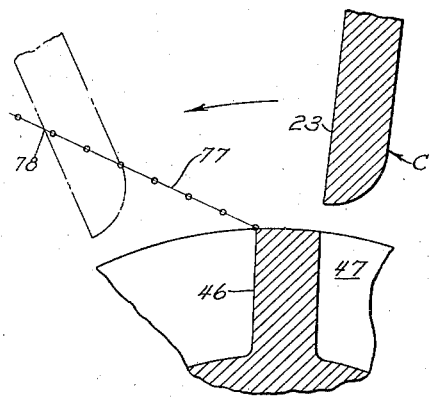
Figure 11 is a diagrammatic sectional view illustrating a modified arrangement of the deflector and abrasive propelling blades of the mechanism shown in Figures 1 to 6, inclusive.

With continued reference to the drawings, wherein like reference characters have been employed to designate like parts throughout the several views thereof, I have illustrated a preferred embodiment of the invention in Figures 1 to 6, inclusive, and with particular reference to these figures, the machine is preferably equipped with a housing 10 having inside replaceable wear liner plates 11, 12 and 13.

Briefly described, the machine comprises a central deflector assembly B, which is operable to receive abrasive from a feed spout D and conduct it axially over the inner ends of a plurality of blades C carried by the rotor.

The top of the housing is preferably closed by a closure plate and liner (not shown) and the bottom thereof is entirely open and unobstructed for the free discharge of abrasive from the apparatus. A shaft 14 extends into housing 10 and is provided with a hub portion 15, to which a head or rotor 16 is removably secured by means of cap screws or the like (not shown).

Rotor 16 is provided with a central aperture which fits over a piloting portion 17 formed on hub 15. It is to be understood that although I have shown a specific rotor construction, any desired rotor construction may be used having outwardly extending blades and it may be of the double disc type, i. e., the blades may be interposed between two rotatable discs, without departing from the spirit of the invention.

Secured to the front face of rotor 16 by means of a plurality of screws 17a are a plurality of segment-shaped plates 18, which form guideways for the blades. Each plate 18 is preferably provided with an arcuate boss 19 which serves to strengthen the plate against flexure in response to forces developed therein through operation of the wheel. The rear surface of each plate 18 is provided with an arcuate recess 19a which cooperates with arcuate members 19b secured in recesses 19c in head 16. Members 19b, which may if desired take the form of pins, serve to accurately locate plates 18 and also assist screws 17a in holding them in position against centrifugal thrust.

Plates 18 are secured to head 16 in spaced apart relationship as shown, and as seen in Figure 2A they are provided with beveled neighboring edges 21 which cooperate to provide dovetail-shaped, outwardly extending blade guideways. As seen in Figure 2 the guideways are preferably inclined at an angle of approximately 10° forwardly with respect to a radius passing through their inner ends. In other words, the blades are inclined outwardly and forwardly with respect to the direction of rotation of the head. Mounted for sliding movement in each guideway is an abrasive propelling blade C having a dovetailed base 22 which fits between surfaces 21 of plates 18 and the face of the rotor. Each blade is provided with an abrasive propelling surface 23 and has an abrasive retaining flange 24 at its free edge.

Blades C may be releasably locked against outward movement by any suitable mechanism and I preferably employ a plurality of key members 26 having lug portions 27 which seat in recesses 28 formed in plates 18 as seen in Figure 2. Keys 26 bridge the outer ends of the guideways and abut the outer ends of blades C, so as to prevent their outward movement.

As seen in Figure 1, keys 26 are restrained against axial movement to the right when they are in locked position by means of a shoulder 29 provided on the blade. The blades are installed by shoving them inwardly slightly beyond their operative position; keys 26 are then inserted with lugs 27 in openings 28, and the blades are then slid outwardly into firm engagement with the keys and with shoulders 29 in locking relationship therewith. If desired a spring 29' or the like may be used to establish sufficient friction between the parts to prevent the blades from sliding inwardly when the wheel is stopped.

The rotor I have disclosed accordingly comprises a disc having a plurality of outwardly extending blades which terminate short of the axis of rotation of the head to define a central space, and although I prefer to employ this construction, as it allows my novel feeding mechanism to be installed in the center of the wheel, it is to be understood that the invention may be practiced with wheels embodying blades which extend entirely to the center of the rotor.

I will now describe the novel deflecting and feeding mechanism of the invention and which is designed to wholly eliminate the central feed cages of the present commercial wheels, thereby obviating the use of a stationary member which is subject to severe wear in use.

A deflector member, which is generically designated as B, is mounted centrally with respect to the rotor in the central space defined by the inner ends of the blades, although as pointed out hereinafter it may assume other shapes and be located other than centrally of the wheel.

The deflector assembly comprises a generally conical section 32 which terminates in a cylindrical flange 33. Flange 33 seats within the central opening of rotor 16 and the assembly is rigidly but removably held in place on the rotor by a stud 34 which projects through an opening in a web 35 of the deflector assembly, and a nut 36. Abrasive is fed to the wheel by any suitable means. For instance, a feed spout assembly D, which delivers the abrasive downwardly and preferably axially toward the rotor and having a discharge end closely adjacent the outer surface of the deflecting assembly B, as shown in Figure 1, to define what will be hereinafter termed a delivery or "pick-up" zone for the abrasive.

The outer surface of the deflector assembly is preferably so formed as to smoothly pick up the abrasive issuing from the feed spout assembly D and propel or conduct it axially toward rotor 16 and then propel it outwardly over the inner ends of blades C, preferably in a somewhat upward direction so that the blades will discharge the abrasive downwardly through the open end of the housing upon the work.

The construction of the preferred form of deflector is shown in detail in Figures 5 and 6, and with particular reference to these figures, the deflector assembly is preferably provided with an outer conical surface 38 although it may be of cylindrical form if desired.

Surface 38 functions primarily as a supporting structure for a plurality of so-called deflector members 39 which project outwardly from the surface and which are preferably equal in number to the number of blades employed. As the particular wheel illustrated embodies four blades, the deflector has been illustrated with four deflecting members 39. If the rotor is provided with more or less than four blades, the number of deflector members is correspondingly increased or decreased. As seen in Figures 5 and 6, members 39 extend to the very end of the deflector member and as seen in Figure 5 they are provided with comparatively thin leading ends 41 and generally helical impelling surfaces 42, which as seen in Figure 4 are inclined slightly forwardly with respect to the direction of rotation of the deflector assembly. In other words, they cooperate with surface 38 to form an abrasive holding trough. The degree to which the outer edges of members 39 overhang surfaces 42 is more clearly seen in Figure 3, wherein the four deflecting members of the deflecting assembly have been laid out in horizontal plan.

Members 39 are provided with inclined outer surfaces 44, which, as seen in Figure 4, are inclined with respect to the surface of revolution generated by the cutting edges of members 39 and designated as 45. The deflecting members 39 are cut away in this manner to enable surface 42 to cleanly sever portions of the abrasive stream as it issues from feed spout D. Surfaces 42, which as pointed out hereinbefore in connection with Figure 4, are concave in section and smoothly merge into substantially radial propelling surfaces 46, and the latter merge into conical surface 38 of the body of the deflector. Propelling surfaces 46 are joined by a circular flange 47 which is provided with a plurality of notches 48 for a purpose that will presently appear. As seen in Figure 5, wherein one of the blades C is illustrated in the position it assumes with respect to the deflector assembly, with propelling surfaces 46 preferably substantially aligning with the propelling surface 23 of the blade, so that the abrasive propelled outwardly by surface 46 may smoothly be delivered to the propelling surfaces of the blades. Also as seen in Figure 6, surface 42 smoothly merges with propelling surface 46, so that there is a smooth transition from one surface to the other and the abrasive does not undergo any impact whatever as it travels from surfaces 42 to surfaces 46.

Taking the operation of the machine as a whole, with rotor 16 operating at approximately 2450 R. P. M. in the direction indicated by the arrow in Figure 2, and with abrasive being fed to the apparatus through feed spout D (preferably at a rate from 15,000 to 30,000 pounds per hour), the abrasive freely drops by gravity between the spaces defined by deflecting members 39 and is smoothly picked up on inclined surfaces 42. In view of the fact that surfaces 42 meet surfaces 44 at an acute angle, the abrasive ribbon issuing from the feed spout is smoothly cut and surfaces 42 are supplied with a substantial quantity of abrasive each time they sweep past the feed spout. The body of abrasive picked up by each surface 42 is not batted or impacted by reason of the fact that surfaces 42 are disposed at an angle of preferably less than 45° with respect to the plane of the rotor, thereby causing them to exert a sliding pick-up of the abrasive. Moreover any tendency for the abrasive to be centrifugally thrown by members 39 is avoided by the inclination of surfaces 42 with respect to surface 38. In other words, any impacting action upon the abrasive due possibly to defects in surface 42 is directed down toward surface 38 rather than outwardly of the machine.

The bodies of abrasive picked up by surfaces 42 are propelled axially toward the rotor by reason of the rotation of the parts and upon reaching surfaces 46, the abrasive smoothly slides outwardly onto blades C. In view of the fact that by this time the abrasive possesses considerable rotative speed, centrifugal force manifests itself as an outward movement of the abrasive onto the inner end of blades C, where it is smoothly picked up and is continuously accelerated until it is discharged from their outer ends at an abrading velocity.

It is therefore seen that by reason of the construction provided, it is possible to gravitationally discharge abrasive downwardly upon the deflector member and cause it to be axially directed into the rotor and be accelerated thereon and be projected downwardly from the blade tips at an abrading velocity without resorting to the use of the impellers and stationary feed cages of the wheels now in commercial use.

When the abrasive attains the outer ends of the blades it is discharged therefrom as indicated by the arrows 51 in Figure 2.

The abrasive may be fed to the deflector mechanism by any suitable means but I prefer to use the spout assembly shown in Figures 1 and 2, and it will now be described.

Housing 10 and liner 13 are provided with openings 52 and 53, respectively, and secured thereover, as by means of a welding or like operation, is a spout housing 54. The lower portion of openings 52 and 53 is closed by an approximately circular plate 55 which is releasably secured in place on housing 10 by means of a plurality of cap screws 56 or the like. Housing 54 is provided with a flat upper wall 57 having a slot 58 of limited length therein. A plate 59 is mounted for sliding movement upon the wall 57. A feed spout 64 is secured to the plate 59 by means of a pair of brackets 61, interposed rubber gaskets 62, and a plurality of screws 63. The feed spout 64 as seen in Figure 3, is of a rectangular form, although it may be circular or oval in section, if desired.

The feed spout assembly is accordingly mounted for sliding movement transversely to the axis of rotation of the wheel by reason of the sliding connection between plate 59 and wall 57. Plate 59 is adapted to be releasably locked in place by means of a pair of set screws 66, which are threaded into a pair of bosses 67 carried by housing 10 and which are adapted to bear against the upper part of plate 59 and clamp it against plate 57. As indicated in Figure 2 the spout 64 is disposed in its centrally adjusted position.

As seen in Figure 1, the lower end of spout 64 inclines downwardly and toward the deflector assembly. Abrasive may be supplied to spout 64 in any suitable manner, preferably through a gravity drop of two or more feet from a valve or metering mechanism to supply it at a predetermined rate of flow. By virtue of the inclination of the lower end of spout 64, the abrasive, after dropping freely through the spout, is given an axial movement. In other words, the abrasive is given an axial component of velocity, with the result that when surfaces 42 pick it up they are called upon to add a final axial velocity component. Therefore, the axial component of velocity imparted to the abrasive by reason of the inclination of feed spout D prevents impact between deflecting members 39 and the abrasive when it is picked up, thereby further minimizing any tendency for the abrasive to be thrown prematurely from the deflector.

As seen in Figure 2, blades C incline outwardly and slightly forwardly with respect to the direction of rotation of head 16 and this is preferably done in order to reduce the outward component of velocity of the abrasive and prevent it from discharging prematurely against the sidewalls of the casing. In other words, the radial component of velocity of abrasive discharged from the wheel is reduced with respect to that of a radial blade by inclining the blade forwardly with respect to the direction of rotation of the wheel.

It is to be understood, however, that my invention is not limited to blades inclining in any particular direction with respect to the direction of rotation of the wheel. As a matter of fact they may, if desired, be provided with a "pocket" or other irregularities at their inner ends for further delaying or reducing the radial component of velocity, and the appended claims are intended to embrace the invention when it assumes this form.

When it is desired to remove and replace blades C, nut 36 is loosened and deflector assembly B is rocked slightly to bring notches 48 into registration with blades C. The blades are then pushed into notches 48, keys 26 are removed and blades then freely slid outwardly in their guides. If desired, however, the blades may permanently assume a position aligning with notches 48 and in that case positioning pins may be provided on the rotor for cooperation with the notches shown in flange 33.

Although I have shown a wheel operating about a horizontal axis it is to be understood, that if desired, the axis may be inclined at an oblique angle or be disposed vertically without departing from the spirit of the invention.

In Figures 7 and 8 I have illustrated the wheel of Figures 1 to 6, inclusive, as being equipped with a rebound guard member for taking care of any abrasive that may fail to be properly picked up by deflector members 39. The rebound guard is provided with a web portion 71 which is secured to housing 10 by means of a pair of cap screws 72. The guard is provided with a short rebound surface 73 and a long curved rebound surface 74 which is concave in section as seen in Figure 8.

In this form of the invention, with the machine operating and abrasive being supplied through spout 64, it is picked up in the manner previously described by the deflecting members 39. Any abrasive that is struck by the corners defined by the merger of surfaces 42 and 44 or otherwise fails to be properly picked up is thrown against surface 74 and rebounds back into the deflector assembly, thereby preventing the abrasive from being thrown out of the machine without performing any useful work. It is to be understood that the deflector member may assume various forms depending upon the conditions encountered in the operation of the wheel and, therefore, the invention is not limited to the particular form illustrated.

In Figures 9 and 10 I have shown a slightly modified form of deflector assembly and it differs in two respects from that shown in Figures 1 to 6, inclusive. First, it is provided with deflecting members 39a which are inclined at a smaller angle with respect to the plane of the rotor than those of Figures 1 to 6, inclusive, so as to exert a less severe propelling action upon the abrasive when it is first picked up. Secondly, a plurality of baffle or rebound members 75 are provided forwardly of each deflecting member 39a and which are designed to confine the abrasive to a definite path on its way to the inner ends of the blades, which is particularly important when an excessive quantity of abrasive is fed to the wheel. The deflecting members 39a each terminate in a comparatively thin leading edge 41a. The outer or peripheral edges 44a of the deflector members also overhang the impelling surfaces 42a as shown in Figure 9. The impelling surfaces 42a in this modification also smoothly merge into substantially radial propelling surfaces 46. The flange 47a in this form of the deflector is quite similar to the flange 47 in the arrangement shown in Figures 3 and 5, except that one end of each of the baffle members 75 is formed integral with the flange 47a.

In Figure 11 I have somewhat diagrammatically illustrated the parts of the machine shown in Figures 1 to 6, inclusive in a somewhat different relationship. With reference to Figure 11, blade C terminates short of flange 47 so as to be spaced therefrom, and it is also disposed rearwardly of propelling surface 46 with the result that there is a lag between the delivery of the abrasive over the outer end of surface 46 and the pick-up of the abrasive by propelling surface 23 of blades C.

The path of a particle discharged from surface 46 is plotted at 77 in Figure 11 and it is seen that the particle attains substantially the position 78 before the blade illustrated in dotted lines, picks it up.

If desired, propelling surface 46 of the deflector assembly may be rearwardly inclined with respect to the direction of rotation or it may be forwardly inclined.

Figure 12:
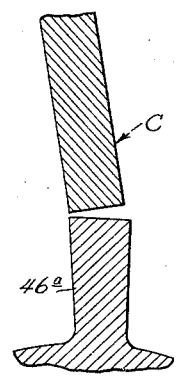
Figure 12 is a view similar to Figure 11 but illustrates a further arrangement of the parts and a modified deflector assembly.

In Figure 12 I have illustrated a deflector assembly wherein propelling surface 46a is inclined forwardly with respect to the direction of rotation of the wheel so as to exert some degree of retarding influence upon the abrasive as it passes outwardly for delivery onto blades C.

It is to be understood that the invention is not limited for use in housings having an open bottom but may be mounted to discharge horizontally either side of the wheel or upwardly depending upon at which angular point the abrasive is admitted to the deflector assembly. In Figure 2 the adjustment may be varied by loosening screws 66 and moving plate 59 so as to dispose the feed spout in different positions.

Figure 13:
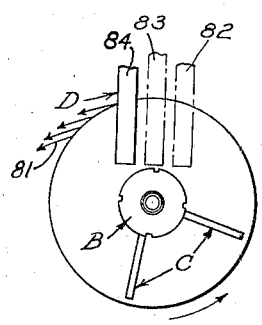
Figure 13 is a diagrammatic view illustrating the various ways in which the feed spout may be adjusted in the machines of Figures 1 to 12, inclusive.

In Figure 13 I have diagrammatically illustrated the manner in which discharge is effected by moving feed spout D. With reference to this figure it is seen that when the feed spout D is in the position illustrated at 82, the abrasive is admitted to deflector B at approximately the three o'clock position with the result that the abrasive discharge occurs to the side of the wheel approximately as indicated by the arrows 81. If desired the feed spout may be moved into the position designated 84 for causing the discharge to be "late" as regards the central setting of the spout designated 83, so as to discharge at the three or four o'clock position.

It is of course understood in connection with all of the forms of the invention, that if it is desired to operate the wheels in the opposite direction from the counter clockwise direction shown, a deflector assembly having opposite-handed deflector members and a rotor having opposite-handed blades will be used, and the discharge from such wheel will occur symmetrically opposite to that shown in the left-handed wheels.

Another form of feed spout that may be employed to feed abrasive to the deflector assembly in offset relationship is illustrated in Figure 14 wherein feed spout 64b is provided with an inclined portion 88 terminating closely adjacent the deflector assembly in approximately the 3 o'clock position so as to cause the discharge to take place to one side of the wheel as indicated by the arrows 89.

Figure 15:
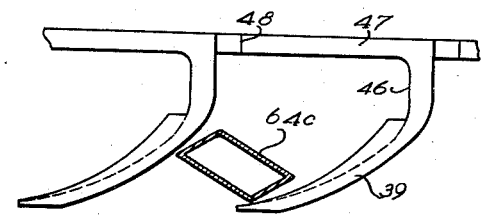
Figure 15 is a view similar to Figure 3 but illustrates a modified form of feed spout cooperating with the deflector assembly.
Figure 16:
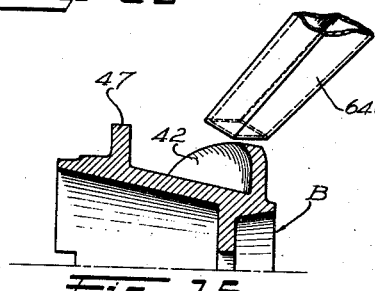
Figure 16 is a longitudinal sectional view of the structure shown in Figure 15 and illustrates the manner in which the feed spout cooperates with the deflector.

In Figures 15 and 16 I have shown the impeller of Figures 1 to 6 inclusive as being fed with a modified feed spout 64c. In Figure 15 the deflector is illustrated in developed form and feed spout 64c is observed to be of elongated trapezoidal cross-section and is disposed at an angle with respect to the axis of rotation of the wheel. This wheel operates much in the same manner as those previously described except for the manner in which the abrasive ribbon issuing from the feed spout is cut by the deflector members 39. It is observed that as members 39 pass the lower end of the feed spout, the abrasive is successively "sliced" from the "ribbon" and the cut is of a slowly progressing character, but in view of the fact that by the time the deflector has cut partially through the abrasive ribbon the last portion of the ribbon is cut by a part of the deflector close to blades, the entire mass of severed abrasive is in effect collected and is delivered to the blades at approximately the same instant. This results in the wheel discharging through a more limited arc.

Figure 17:
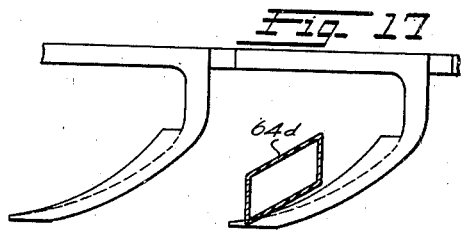
Figure 17 is a view similar to Figure 15 but illustrates a further modified form of feed spout cooperating with the deflector.

Under some conditions, it may be desirable to use a feed spout of the character shown in Figure 17, wherein a feed spout 64d is inclined in the opposite direction, namely, so as to cause the abrasive to be more rapidly cut from the abrasive stream. However, as the entire mass of abrasive is cut by the same portion of the deflector, the discharge will occur over a wider arc than with the feed spout of Figures 15 and 16.

Figure 18:
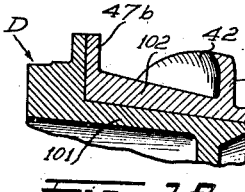
Figure 18 is a longitudinal fragmental sectional view of a further form of deflector assembly of sectional character.

In Figure 18, I have shown a modified form of deflector assembly D' wherein a primary or supporting member 101 is provided and which is secured to the rotor and it in turn carries the deflector member proper 102 and which is provided with the deflecting members 39b and flange 47b and the other parts previously described.

Figure 19:
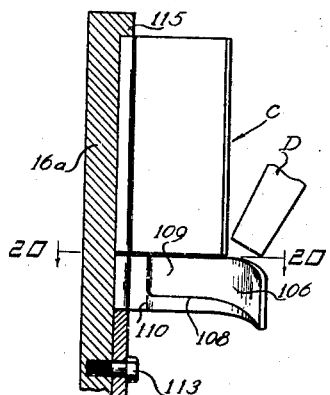
Figure 19 is a longitudinal sectional view of a modified form of centrifugal wheel embodying the invention and shows individual deflector members associated with the blades.
Figure 20:
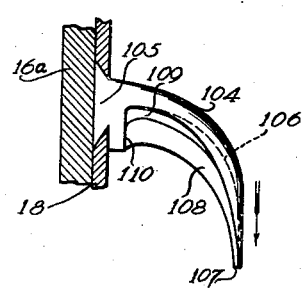
Figure 20 is a view taken substantially on the line 20—20 of Figure 19.

In Figures 19 and 20 I have illustrated a further modified form of machine embodying the invention and with particular reference to these figures, rotor 16a is provided with plates 18 forming guideways as previously described and blades C are slidably disposed therein. However, in this instance the central deflector assembly is dispensed with and a separate individual deflector 104 is provided for each blade and it is provided with a dovetailed base 105 so that it may be slidably mounted in the same guideways as the blades.

Each deflector member, as seen in Figure 20, is provided with a generally helical pick-up surface 106; a sharp leading edge 107; a bottom flange 108; and a substantially radial portion 109 which delivers the abrasive onto the inner ends of blades C.

In view of the fact that at the speed of 2450 R. P. M. the abrasive is picked up by helical wall 106 before it has an opportunity to drop into the hollow central space in the wheel, wall 108 is not absolutely essential and may be omitted if desired. I have also provided a wall 110 adjacent the base of the deflector for preventing abrasive from striking the upper side of plate 18 thereby minimizing wear thereof. In order to prevent the deflector members from moving inwardly out of their guideways, I provide a central plate 112 which is removably secured to the rotor by a set screw 113, and which abuts the inner ends of the deflectors. As seen in Figure 19, rotor 16a is provided with an annular boss 115 which prevents outward movement of the blades and deflector members. The blades and deflector members are removed by removing plate 112 and moving the parts into the center of the wheel and removing them axially. If desired, however, the rotor and the keys 26 of Figures 1 and 2 may be employed to hold the blades and deflector members in position on the rotor.

This form of the invention functions in substantially the same manner as the form shown in Figures 1 to 6, inclusive, as the abrasive issuing from feed spout D is picked up by deflector members 104 and is thrown into the blades and discharged therefrom at an abrading velocity. By reason of the construction of this form of the invention, the blades and deflector members are readily removed and replaced when they become so worn as to be unfit for further service.

Figure 21:
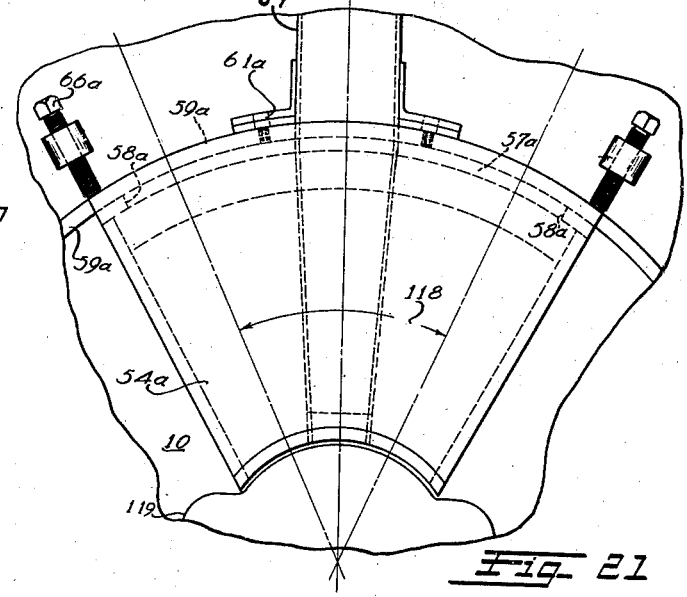
Figure 21 is an end elevational view of a modified form of spout holding assembly.

In Figure 21 I have shown a modified form of spout holding assembly, and as it differs from that shown in Figures 1 and 2 only in the fact that the spout is angularly adjustable rather than transversely.

In this form of the invention, plates 57a and 59a are curved so that upon release of screws 66d, the spout may be adjustable angularly about the axis of the machine through the angle 118, to vary the point of admission of abrasive to the deflector. Housing 54a is provided with a curved lower wall and a modified form of closure plate 119 cooperates therewith and is held in place on the casing 10 by means of cap screws (not shown). In this modification the feed spout 64 is also mounted on the plate 59a by means of a plurality of brackets 61a so that the abrasive supply pipe may be moved circumferentially through the slot 58a which is provided in the plate 57a.

Figure 22:
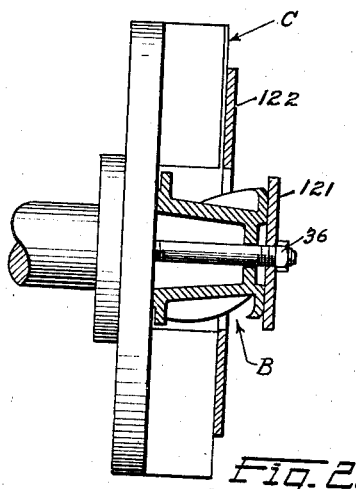
Figure 22 is a view similar to Figure 1 but shows the wheel equipped with abrasive rebound plates for preventing premature discharge of the abrasive from the deflector assembly.

In Figure 22 I have shown the machine of Figures 1 to 6, inclusive, equipped with guard plates which are useful in certain installations. Secured to the end of deflector B by means of nut 36 is a disc 121 which preferably is of a diameter equal to the overall diameter of deflector members 39, for preventing abrasive from rebounding to the right in this figure and escaping from the deflector assembly.

Disc 121, accordingly, cooperates with members 39 to define closed pockets and therefore if desired the deflector member may be formed or cast with webs joining their leading edges 41, so as to thereby obviate the need for disc 121.

The machine may also embody an annular plate 122 which is secured to the side edges of the blades or any other suitable rotating or stationary part of the machine in any suitable manner. If desired, however, it may be made integral with the deflector assembly or be removably secured thereto, so as to be removable from the machine as a unit with the deflector assembly.

Plate 122 has an inner diameter sufficiently large to permit it to fit over the deflector assembly and it functions to prevent premature feed of abrasive into the blades. For instance, should abrasive be thrown toward the rotor by improper impact with members 39, it will strike plate 122 and be deflected against the housing. However, as the abrasive does not possess any considerable velocity when it is thrown in this manner, it produces no appreciable wear of the housing. If this rebounding abrasive were allowed to enter and be picked up by the blades it would be propelled at an abrading velocity against the inner wall of the housing, producing considerable wear thereof.

It should be particularly observed in connection with all of the forms of invention disclosed, that as the inner ends of the blades are not called upon to cut the abrasive stream, they need not be bevelled or "sharpened" and hence may be removed and reversed in their guides when they have become partially worn. For instance, it has been found that the blades wear most rapidly at their outer ends and, therefore, by reversing them when partially worn, the maximum life may be obtained from a set of blades.

Figures 23, 24:
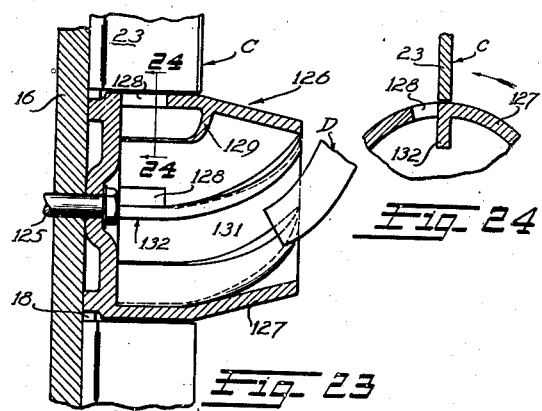
Figure 23 is a longitudinal sectional view of a modified form of apparatus also forming part of the invention.
Figure 24 is a fragmental sectional view taken on the line 24—24 of Figure 23.

In Figures 23 and 24 I have shown a machine embodying what may be termed an "internal" deflector, as the deflector members are disposed inside a cylindrical shell.

The rotor construction is the same as that shown in Figures 1 to 6, inclusive, and embodies rotor 16 and blades C. Secured to rotor 16 in the space defined by the inner ends of plates 18, by means of a bolt 125, is a deflector assembly 126, comprising a cylindrical shell 127 having a plurality of discharge ports 128 registering with the four blades of the rotor.

Provided on the inner wall of member 127 are four deflector members 129 which correspond generally in structure and function to deflector members 39 of the previously described forms of the invention. Each deflector member is provided with a helical abrasive "pick-up" portion 131 and a substantially radial propelling portion 132 which aligns with one wall of opening 128 and which in turn substantially registers with the propelling surface 23 of the blade, as seen in Figure 24.

Feed spout D projects into member 127 and feeds the abrasive onto helical portions 131 of the deflectors and it is propelled axially onto surfaces 132. Surfaces 132 in turn propel the abrasive through openings 128 onto the inner ends of the blades.

As it takes approximately one-half of a revolution to discharge the abrasive after it has been admitted to the inner ends of the blades, and as the abrasive is fed onto the blades in approximately the 5 o'clock position in the wheel of Figures 23 and 24, it will discharge upwardly and it is accordingly primarily intended for installation where the abrasive must be thrown upwardly, although the point of discharge may be varied to some degree by angularly adjusting the position of the discharge end of the feed spout, as previously set forth.

Although I have shown member 127 as being of generally cylindrical form, it is to be understood that it may be of cone-shaped configuration if desired, with the diameter of the cone increasing toward the rotor, so as to allow centrifugal force to manifest itself and assist in feeding the abrasive over helical surfaces 131, without departing from the spirit of the appended claims.

In Figures 25 and 26 I have illustrated a modified form of deflector assembly somewhat similar to that of Figures 1 to 6, inclusive. In this form, however, there is provided a preferably concave surface 141 smoothly meeting surface 46 along a curved line 142 and smoothly meeting surface 38 along curved line 143. In this form of the invention, the abrasive is axially propelled by surfaces 42 as before, but when it reaches surface 141 it is smoothly deflected outwardly onto the vanes. This effects a more uniform distribution of the abrasive throughout the width of the blade. If desired, surfaces 141 may be convex or be provided with bumps or other formations, depending upon the conditions under which the machine is operating, in order to get the best possible distribution of the abrasive.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an abrading apparatus, a rotor having a plurality of outwardly extending blades, means for feeding abrasive to a pick-up zone in proximity to the axis of rotation of said rotor, and a plurality of members for deflecting abrasive axially from said pick-up zone onto said blades, said members having generally helical deflecting surfaces and a baffle member spaced forwardly of each deflecting surface, for controlling the degree of rebound from said helical surfaces.

2. In an abrading apparatus, a rotor having a plurality of outwardly extending guideways provided thereon, a plurality of abrasive propelling blades mounted in said guideways, means located at the outer end of said guideways for releasably locking said blades against outward movement, a deflector assembly for feeding abrasive onto the inner ends of said blades, said deflector assembly having a flange located inwardly of said blades, means for releasably securing said deflector assembly to said rotor, said flange having a plurality of notches therein, to allow said blades to be moved inwardly beyond their locked positions for permitting release of said locking means.

3. A deflector assembly for use in an abrading apparatus, comprising a plurality of axially extending helical abrasive propelling members terminating in substantially spoon-shaped pockets, said pockets leading onto substantially radial discharge surfaces located on said members.

4. In an abrading apparatus, a head structure mounted for rotation and having a plurality of outwardly extending abrasive propelling blades provided thereon; means for feeding abrasive downwardly adjacent said blades and delivering it to a pick-up zone in proximity to the axis of rotation of said head structure but offset axially from said blades; said feeding means delivering abrasive at only a limited arc about the axis of rotation, and deflector means mounted for synchronous rotation with said head structure and comprising a plurality of substantially helical surfaces disposed in said pick-up zone and extending to a region adjacent the inner ends of said blades for axially deflecting the delivered abrasive onto said blades adjacent the inner ends thereof at a predetermined point in the rotation of said head structure for causing said abrasive to be smoothly picked up by said blades and be discharged from the outer ends thereof at an abrading velocity, said abrasive being acted upon solely by said deflector means from the time it leaves said feeding means until it is picked up by said blades.

5. In an abrading apparatus, a rotor mounted for rotation at high speed and having at least one abrasive deflecting blade unit provided thereon; said unit having a comparatively long abrasive accelerating and propelling surface beginning near the inner end and extending to the outer end of said blade unit, the inner end of said blade unit having an axially directed deflector portion projecting laterally beyond the side edges of the abrasive accelerating and propelling surface thereof into an abrasive pick-up zone, said deflector portion having a generally helical deflecting surface, and means for feeding abrasive onto said helical surface of said deflector portion only while said helical surface is passing through a predetermined arc of rotation, whereby said abrasive is rapidly deflected axially and introduced onto the inner end of said accelerating and propelling surface while the latter is passing through a predetermined arc of rotation and is discharged from the outer end thereof at an abrading velocity in a predetermined direction.

6. In an abrading apparatus, a head structure mounted for rotation and having a plurality of outwardly extending abrasive propelling blades provided thereon; means for feeding abrasive downwardly to a predetermined point in the rotation of said head structure and adjacent said blades and delivering it to a pick-up zone in proximity to the axis of rotation of said head structure but offset axially from said blades; deflector means mounted for synchronous rotation with said head structure and comprising a plurality of substantially helical surfaces disposed in said pick-up zone and extending to a region adjacent the inner ends of said blades for axially deflecting the delivered abrasive onto said blades adjacent the inner ends thereof at a predetermined point in the rotation of said head structure for causing said abrasive to be smoothly picked up by said blades and be discharged from the outer ends thereof at an abrading velocity, said abrasive being acted upon solely by said deflector means from the time it leaves said feeding means until it is picked up by said blades, and a stationarily supported rebound member located adjacent the periphery of said deflector means and immediately in advance of the feed means with respect to the direction of rotation of the deflector means for rebounding back into the latter any abrasive which fails to be properly picked up thereby.

7. In an abrading apparatus, a head structure mounted for rotation and having a plurality of outwardly extending abrasive propelling blades provided thereon; feeding means for conducting abrasive from an abrasive supply downwardly to a delivery zone located adjacent the axis of rotation of said head structure, said feeding means and said delivery zone being located wholly outside the space defined by the planes of rotation of the side edges of said blades; and rotatable deflector means, mounted for synchronous rotation with said head structure and extending from said delivery zone to a region adjacent the inner ends of said blades, for conducting said abrasive from said delivery zone axially onto the surfaces of said blades adjacent the inner ends thereof at a predetermined point in the rotation of said head structure, said feeding means delivering abrasive to said deflector means at a predetermined point in the rotation thereof, said abrasive being acted upon solely by said rotatable deflector means from the time it leaves said feeding means until it is picked up by said blades, said deflector means comprising a plurality of blade elements mounted on said head structure and having generally helical abrasive deflecting surfaces.

8. In an abrading apparatus, a head structure mounted for rotation and having a plurality of outwardly extending abrasive propelling blades provided thereon; feeding means for conducting abrasive from an abrasive supply downwardly to a delivery zone located adjacent the axis of rotation of said head structure, said feeding means and said delivery zone being located wholly outside the space defined by the planes of rotation of the side edges of said blades; and rotatable deflector means, mounted for synchronous rotation with said head structure and extending from said delivery zone to a region adjacent the inner ends of said blades, for conducting said abrasive from said delivery zone axially onto the surfaces of said blades adjacent the inner ends thereof at a predetermined point in the rotation of said head structure, said feeding means delivering abrasive to said deflector means at predetermined point in the rotation thereof, said abrasive being acted upon solely by said rotatable deflector means from the time it leaves said feeding means until it is picked up by said blades, said last-named means comprising a plurality of blade elements corresponding in number to said blades and having surfaces terminating in close proximity to the inner ends of said blades, said blade elements having generally helical abrasive surfaces extending into said delivery zone, and operating in timed relationship to said blades.

9. In an abrading apparatus, a head structure mounted for rotation and having a plurality of outwardly extending abrasive propelling blades provided thereon; means for feeding abrasive downwardly adjacent said blades and delivering it to a pick-up zone in proximity to the axis of rotation of said head structure but offset axially from said blades; said feeding means delivering abrasive at only a limited arc about the axis of rotation; and deflector means mounted for synchronous rotation with said head structure and comprising a plurality of substantially helical surfaces disposed in said pick-up zone and extending to a region adjacent the inner ends of said blades for axially deflecting the delivered abrasive onto said blades adjacent the inner ends thereof at a predetermined point in the rotation of said head structure for causing said abrasive to be smoothly picked up by said blades and be discharged from the outer ends thereof at an abrading velocity, said abrasive being acted upon solely by said deflector means from the time it leaves said feeding means until it is picked up by said blades, and a closure at the ends of said helical surfaces in said pick-up zone for preventing abrasive from flowing over the end of said deflector means.

10. In an abrading apparatus, a head structure mounted for rotation and having a plurality of outwardly extending abrasive propelling blades provided thereon; feeding means for conducting abrasive from an abrasive supply downwardly to a predetermined point in the rotation of said head structure and to a delivery zone located adjacent the axis of rotation of said head structure, said feeding means and said delivery zone being located wholly outside the space defined by the planes of rotation of the side edges of said blades; and rotatable deflector means extending from said delivery zone to a region adjacent the inner ends of said blades, for conducting said abrasive from said delivery zone axially onto the surfaces of said blades adjacent the inner ends thereof at a predetermined point in the rotation of said head structure, said deflector means including a blade member associated with each of said propelling blades, each blade member being substantially flat at its portion adjacent the inner ends of said propelling blades and having a concave forward face at its portion registering with the delivery zone to retain abrasive upon said blade member and conduct it to said blades, said abrasive being acted upon solely by said rotatable deflector means from the time it leaves said feeding means until it is picked up by said propelling blades.

11. In an abrading apparatus, a head structure mounted for rotation and having a plurality of outwardly extending abrasive propelling blades provided thereon; feeding means for conducting abrasive from an abrasive supply downwardly to a predetermined point in the rotation of said head structure and to a delivery zone located adjacent the axis of rotation of said head structure, said feeding means and said delivery zone being located wholly outside the space defined by the planes of rotation of the side edges of said blades; and rotatable deflector means extending from said delivery zone to a region adjacent the inner ends of said blades, for conducting said abrasive from said delivery zone axially onto the surfaces of said blades adjacent the inner ends thereof at a predetermined point in the rotation of said head structure; said deflector means including a blade member associated with each of said blades, each blade member extending forwardly in the direction of rotation away from said propelling blades at an angle less than 45° with respect to the plane of the rotor for substantially a distance equal to the circumferential spacing between the blade members at the inner ends of the propelling blades, said abrasive being acted upon solely by said rotatable deflector means from the time it leaves said feeding means until it is picked up by said blades.

12. A deflector assembly for centrifugal blasting apparatus comprising, a rotatable support having a generally frusto conical outer peripheral surface, a plurality of blade members carried by said support projecting outwardly from the periphery of said frusto conical surface and extending obliquely over the periphery of said support, means for supplying abrasive to the blade members while moving through a limited circumferential arc at the smaller diameter portion of said deflector, whereby the abrasive is deflected axially by said blade members to the larger diameter portion of the support where greater circumferential velocity is imparted to the deflected abrasive so that centrifugal force is developed to move the axially deflected abrasive radially from the deflector.

13. A deflector assembly for centrifugal blasting apparatus comprising, a rotatable support having a generally frusto conical outer peripheral surface; a plurality of blade members carried by said support projecting outwardly from the periphery of said frusto conical surface and extending obliquely over the periphery of said support, a lip on each blade member projecting forwardly therefrom with respect to the direction of rotation and spaced radially outward from said support and extending lengthwise of the blade members substantially parallel to said frusto conical surface, means for guiding abrasive onto the blade members while moving through a limited arc in the rotation thereof and at the smaller diameter portion of said deflector whereby the abrasive is deflected axially by portions of the blade members radially inwardly of said lips to the larger diameter portion of the support and beyond the ends of said lips so that the abrasive may move radially from the deflector.

14. In abrading apparatus, a rotor having a plurality of outwardly extending abrasive propelling blades, means for feeding abrasive downwardly to a region closely adjacent the axis of rotation of said rotor to an abrasive pick-up zone of limited circumferential extent located outside the planes of rotation defined by the side edges of said blades, each of said blades terminating short of the axis of rotation of said rotor and having a deflector member associated with the inner end thereof, each deflector member having an outwardly extending portion substantially registering with the inner ends of said blades and a generally helical portion projecting axially into said pick-up zone and operable to propel abrasive from said pick-up zone onto said blades adjacent the inner ends thereof at a predetermined point in the rotation of said rotor, and the helical portion of each of said deflector members terminating in a flange for preventing abrasive from being centrifugally thrown therefrom.

15. In abrading apparatus, a rotor having a plurality of outwardly extending abrasive propelling blades, means for feeding abrasive downwardly to a region closely adjacent the axis of rotation of said rotor to an abrasive pick-up zone of limited circumferential extent located outside the planes of rotation defined by the side edges of said blades, each of said blades terminating short of the axis of rotation of said rotor and having a deflector member associated with the inner end thereof, each deflector member having an outwardly extending portion substantially registering with the inner ends of said blades and a generally helical portion projecting axially into said pick-up zone and operable to propel abrasive from said pick-up zone onto said blades adjacent the inner ends thereof at a predetermined point in the rotation of said rotor, and said means for feeding abrasive comprising a feed spout having means for adjusting the discharge end thereof substantially tangentially with respect to the surface of revolution defined by the outer edges of said deflector members, for varying the manner in which the abrasive is acted upon by said deflector members in said pick-up zone.

16. In abrading apparatus, a rotor having a plurality of outwardly extending abrasive propelling blades, means for feeding abrasive downwardly to a region closely adjacent the axis of rotation of said rotor to an abrasive pick-up zone of limited circumferential extent located outside the planes of rotation defined by the side edges of said blades, each of said blades terminating short of the axis of rotation of said rotor and having a deflector member associated with the inner end thereof, each deflector member having an outwardly extending portion substantially registering with the inner ends of said blades and a generally helical portion projecting axially into said pick-up zone and operable to propel abrasive from said pick-up zone onto said blades adjacent the inner ends thereof at a predetermined point in the rotation of said rotor, and said means for feeding abrasive comprising a feed spout having means for adjusting the discharge end thereof substantially circumferentially with respect to the axis of said rotor.

WM. A. ROSENBERGER.